United States Patent [19]

Yanai et al.

[11] Patent Number: 4,742,484
[45] Date of Patent: May 3, 1988

[54] DATA TRANSMISSION APPARATUS HAVING TWO UNIDIRECTIONAL TRANSMISSION CONNECTION LINES TRANSMITTING DATA FROM SLAVE STATIONS LOCATED DOWNSTREAM TO A MASTER STATION AT HIGH SPEED

[75] Inventors: Takao Yanai, Hitachi; Yoshiaki Takahashi, Mito; Toshio Ozawa, Hitachi, all of Japan

[73] Assignee: Hitachi, Ltd., Tokyo, Japan

[21] Appl. No.: 687,766

[22] Filed: Dec. 31, 1984

[30] Foreign Application Priority Data

Dec. 29, 1983 [JP] Japan ............................ 58-248153

[51] Int. Cl.[4] .......................................... G06F 3/00
[52] U.S. Cl. ............................................. 364/900
[58] Field of Search ... 364/200 MS File, 900 MS File

[56] References Cited

U.S. PATENT DOCUMENTS

| 4,365,294 | 12/1982 | Stokken | 364/200 |
|---|---|---|---|
| 4,370,744 | 1/1983 | Hirano et al. | 370/88 |
| 4,387,458 | 6/1983 | Carbrey | 370/88 |
| 4,408,300 | 10/1983 | Shima | 364/900 |
| 4,446,551 | 5/1984 | Seo | 370/16 |
| 4,460,994 | 7/1984 | Scanlon et al. | 370/88 |
| 4,501,021 | 2/1985 | Weiss | 455/601 |
| 4,528,675 | 7/1985 | Esterling et al. | 375/9 |
| 4,542,496 | 9/1985 | Takeyama et al. | 370/16 |
| 4,542,502 | 9/1985 | Levinson et al. | 370/88 |
| 4,587,651 | 5/1986 | Nelson et al. | 370/88 |

Primary Examiner—Raulfe B. Zache
Assistant Examiner—Ayni Mohamed
Attorney, Agent, or Firm—Antonelli, Terry & Wands

[57] ABSTRACT

A master station and a plurality of slave stations are connected in multi-drop connection. A carrier wave on an upstream transmission line between the master station and the slave stations is demodulated and remodulated in each slave station and always maintained to be on-state. Both the modulating and demodulating devices are performed by a MODEM following the protocol CCITT V.28, respectively. Each MODEM used is connected to the respective slave station by a signal line following the protocol EIAR3 232C.

13 Claims, 7 Drawing Sheets

DATA TRANSMISSION APPARATUS HAVING TWO UNIDIRECTIONAL TRANSMISSION CONNECTION LINES TRANSMITTING DATA FROM SLAVE STATIONS LOCATED DOWNSTREAM TO A MASTER STATION AT HIGH SPEED

BACKGROUND OF THE INVENTION

This invention relates to a data collection apparatus of multi-drop or multi-point connection type including a master station connected to a plurality of slave stations through two unidirectional transmission lines, and more particularly to a data collection apparatus for transmitting the response data from slave stations to the master station with a high speed.

For example, a data collection apparatus including a master station connected to slave stations by multi-drop connection is publicly known in a Japanese Laid-Open Patent Application No. 107487/77 "Data collection apparatus of multi-drop 1 vs. N type for remote monitoring control systems". The master station calls a plurality of slave stations one by one and collects the response data from the slave stations. The minimum time required for calling out the slave station and obtaining the response data T (called period of the slave station) is given by $$T = t_1 + t_2 + t_3 + t_4$$

where

- $t_1$ is a slave station call time required for the master station to call for the slave station;
- $t_2$ is a transmission switch-on control time from the switch-on (ON) of the carrier wave of a modulation apparatus to the data transmission by the execution of transmission control of the slave station;
- $t_3$ is a response data transmission time of the slave station; and
- $t_4$ is a tansmission switch-off control time from the end of data transmission of the slave station to the switch-off (OFF) of the carrier wave.

The carrier wave ON/OFF control of the modulator in the slave station is necessary, because the upward transmission line to the master station allows only one carrier wave for the data transmission from a slave station.

That is, when the ON/OFF control of the carrier wave is not executed, the carrier waves for the data transmission from a plurality of slave stations are mixed in the upward transmission line and hence the master station cannot demodulate accurately the response data of the slave station corresponding to a call from the master station. Now, assuming that a modulator-demodulator of 4800 BPS is used, the time required for transmission of 1 bit data is 208 µs. Since the above-mentioned transmission switch-on control time $t_2$ should be 708 ms according to the advice of CCITT, no high-speed call of each slave station has been effected by the prior art. According to a specific example, when the modulator-demodulator of 4800 BPS is used, the times $t_1$, $t_2$, $t_3$ and $t_4$ mentioned above are respectively $t_1 = 12$ ms, $t_2 = 708$ ms, $t_3 = 65$ ms and $t_4 = 2$ ms. Therefore, the time T from the call of the slave station to the receipt of the response data from the slave station (hereinafter referred to as a slave station call period) required 787 ms.

SUMMARY OF THE INVENTION

An object of this invention is to provide a data collection apparatus of the multi-drop or multi-point connection type in which the slave station call period is shortened by making unnecessary the ON/OFF control of the carrier wave at the time of data transmission from the slave station. A feature of this invention is that a carrier wave on the upstream tansmission line between the master station and the slave stations connected with multi-drop or multi-point connection is once demodulated and modulated again in each slave station to maintain the carrier wave continuously in the ON state so as to make unnecessary the ON/OFF control of the carrier wave. Other objects and features of this invention will be made more apparent from the following detailed description with reference to embodiments and accompanying drawings, in which:

DESCRIPTION OF THE PREFERRED EMBODIMENTS

Figure 1:
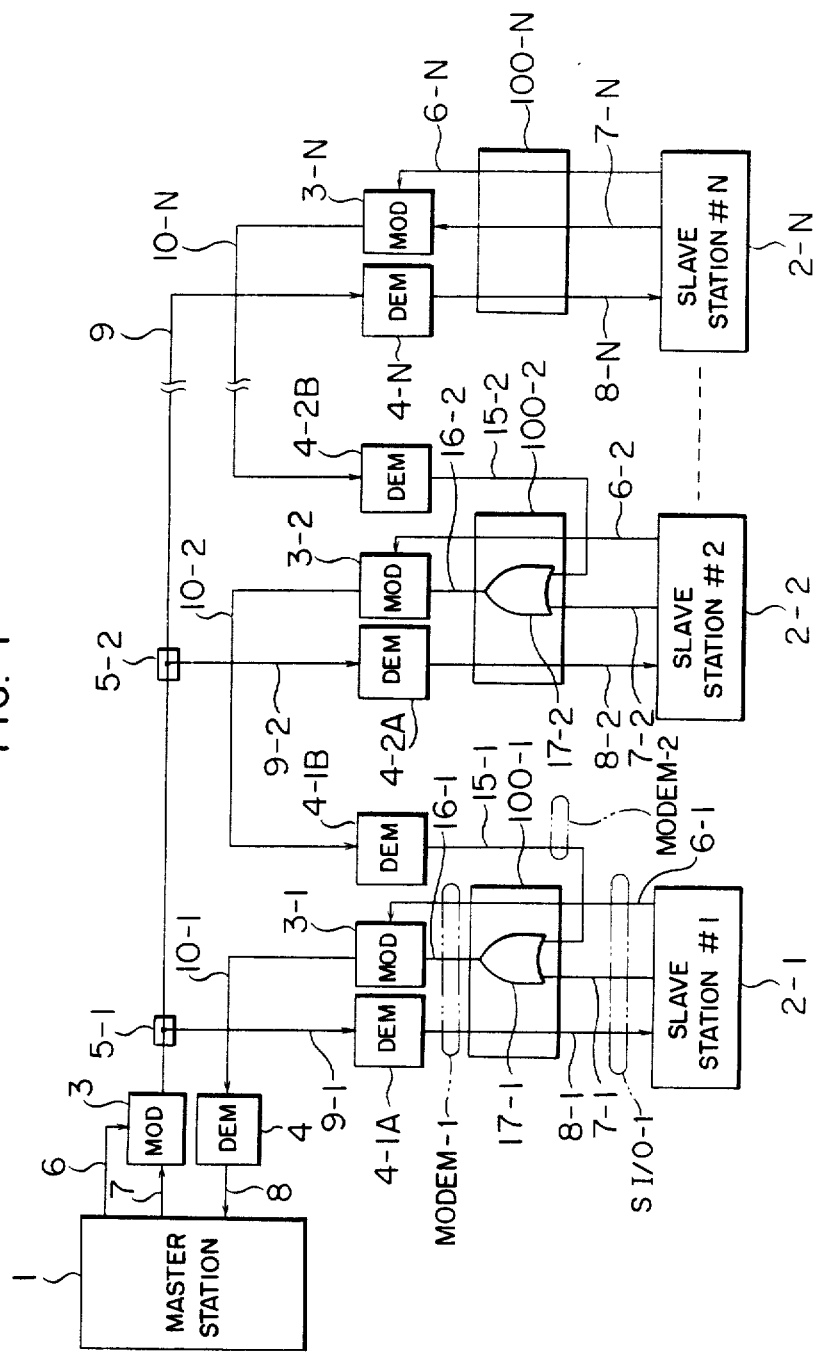
FIG. 1 is the principle constitutional diagram of one embodiment of the invention.

In FIG. 1, a master station 1 is connected to a downstream transmission line 9 through a modulation apparatus 3. A transmission data signal 7 is introduced to the modulation apparatus 3 together with a transmission control signal 6 and sent to the downstream transmission line 9. The downstream transmission line 9 is connected to the demodulation apparatus 4 (4-1A-4-N) of associated with each slave station 2 (2-1-2-N) through a respective shunt apparatus 5 (5-1-5-N-1). Received data signal 8 (8-1-8-N) of each demodulator 4 is introduced to each slave station 2 (2-1-2-N). In the most or furthest downstream slave station 2-N, the signal on the downstream transmission line 9 is introduced directly to the demodulator 4-N, i.e. without passing a shunt apparatus.

The above-mentioned construction is the same as that of the prior art. According to the present invention, in addition to the demodulators 4 (4-1A-4-N), demodulation apparatus 4-1B, 4-2B, . . . are provided. The signal on the upstream transmission line 10 (10-2-10-N) is connected through the additionally provided demodulator to the modulator of a slave station concerned. For example, the signal on the transmission line 10-2 is demodulated by a demodulator 4-1B. The demodulated signal 15-1 is led to the modulator 3-1 of a slave station 2-1 through an OR gate 17-a, modulated again, and supplied to the upward transmission line 10-1. A transmission data signal 7-1 from the slave station 2-1 and an output 15-1 from the demodulator 4-1B are applied to the modulator 3-1 through the OR gate 17-1. Here, the output of the OR gate 17-1 is denoted by a reference numeral 16-1 for convenience. The master station executes a call to the slave stations 2 (2-1–2-N) and gathers the response data therefrom. Each slave station supplies continuously a carrier wave to the upstream transmission line 10 (10-1–10-N) by turning on the transmission control signal 6 (6-1–6-M) and operates continuously the modulator 3 (3-1–3-N). When the master station 1 executes a call to a slave station, no station other than the first or least downstream slave station, from hereon called the self slave station supplies a self transmission data signal 7 (7-1–7-N), i.e., generated by the self station. Then, the modulation outputs of the slave stations 2 lying upstream the self station are demodulated by the demodulators 4 (4-1B, 4-2B, . . . ) connected to the upstream transmission line 10 of the upstream slave stations 2. The demodulated output signal 15 (15-1,–. . . ) is introduced as a modulation input signal 16 (16-1-16-N) of the modulator 3 (3-1-3-N) through the OR gate 17, modulated again, and sent as a modulated output on the upstream tansmission line 10 of the self slave station. This demodulated output passes through the demodulator 4 of the master station 1 and becomes a received data signal 8 of the master station 1.

Figure 2:
FIG. 2 is a diagram showing one example of the transmission format.

This master station 1 calls a slave station 2 through the downstream transmission line 9. In order to discriminate the slave station called, a slave station address is inserted in the transmission format, as shown in FIG. 2. The called slave station gives a return signal to this call via the upstream transmission line 10. As in the case of a call from the master station, a slave station address is inserted in order that the master station can discriminate the slave station which has sent the return signal.

Figure 3:
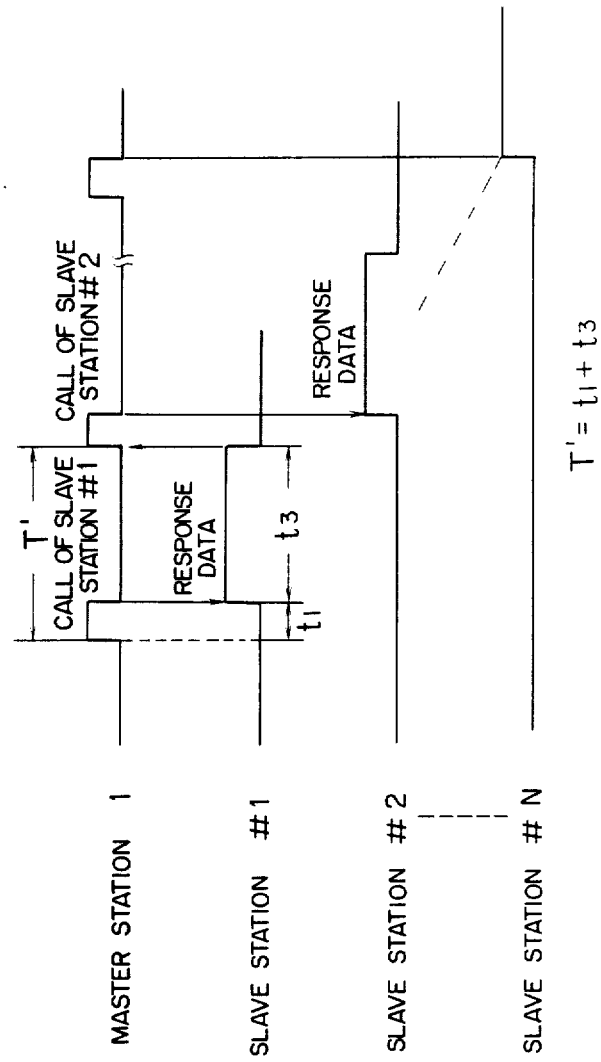
FIG. 3 is a time chart of data transmission according to this invention.

In the embodiment of FIG. 1, the minimum time T of the slave station call period in the case when the master station calls the slave stations sequentially is given by the sum of the slave station all time $t_1$ of the master station and the response data transmission time $t_3$ of the slave station, as shown in FIG. 3. Thus, the call time period can be largely reduced. While T was 787 ms in the prior art of 4800 BPS, it becomes 77 ms under the same condition shown in FIG. 3. According to this invention, since the ON/OFF control time of the carrier wave becomes unnecessary in this invention, the data collection from a plurality of slave stations can be performed with a high speed.

Figure 4:
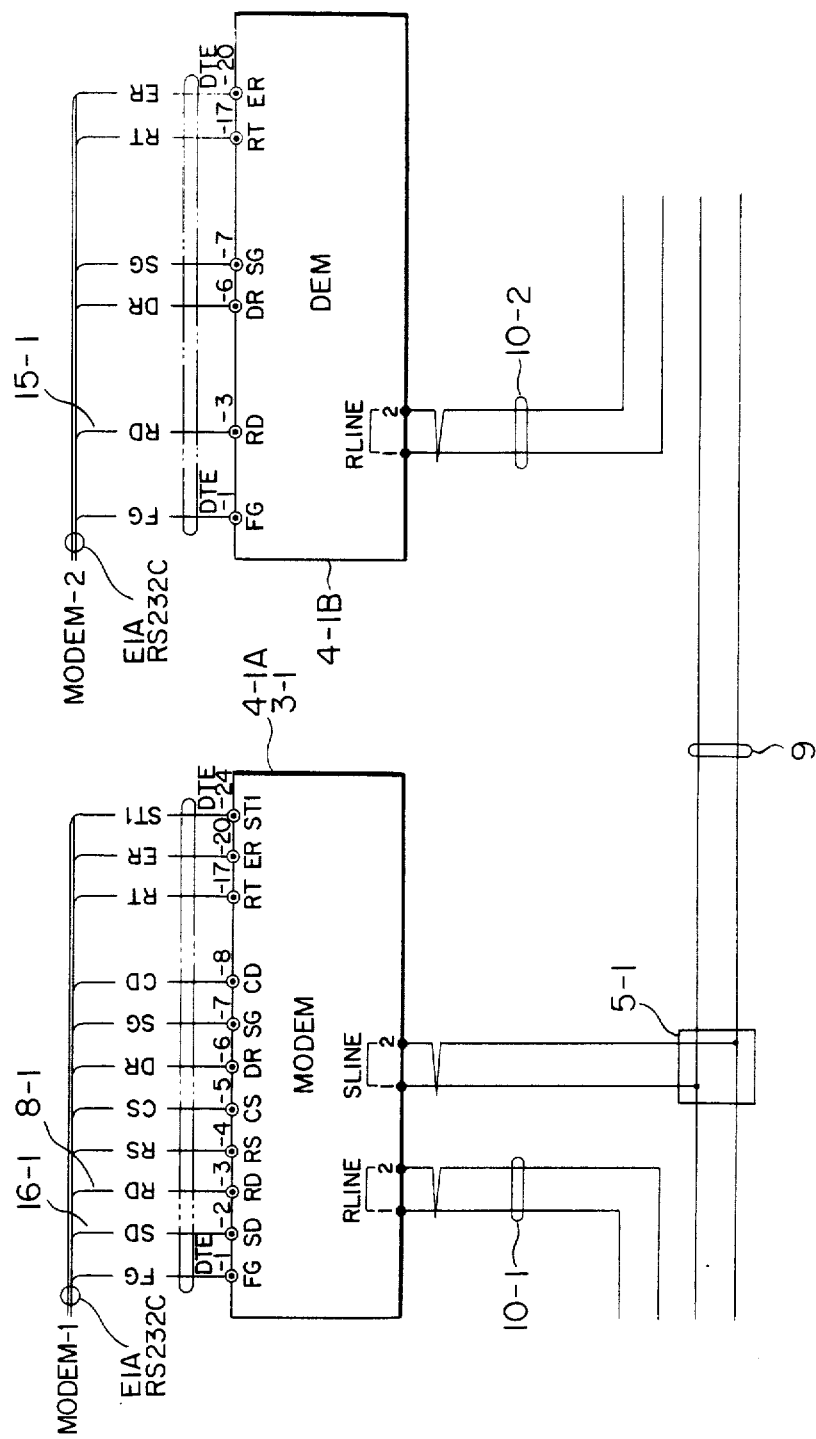
FIG. 4 is a diagram showing one example of modulation-demodulation apparatus (MODEM) used in this invention.
Figure 5:
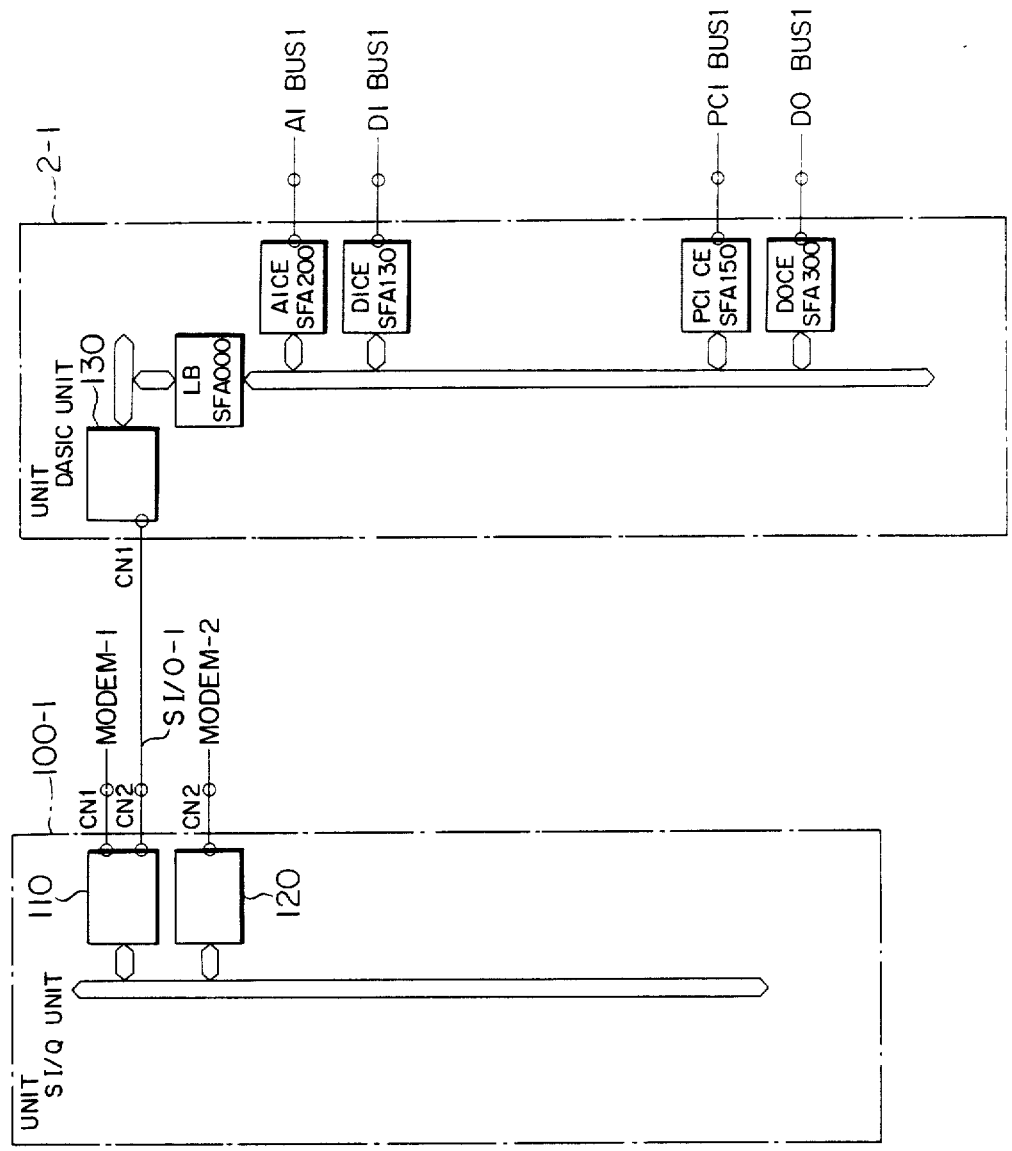
FIG. 5 is a diagram showing the connection relation between a slave station apparatus 2-1 and a serial input-/output unit 100-1 used in this invention.
Figure 6:
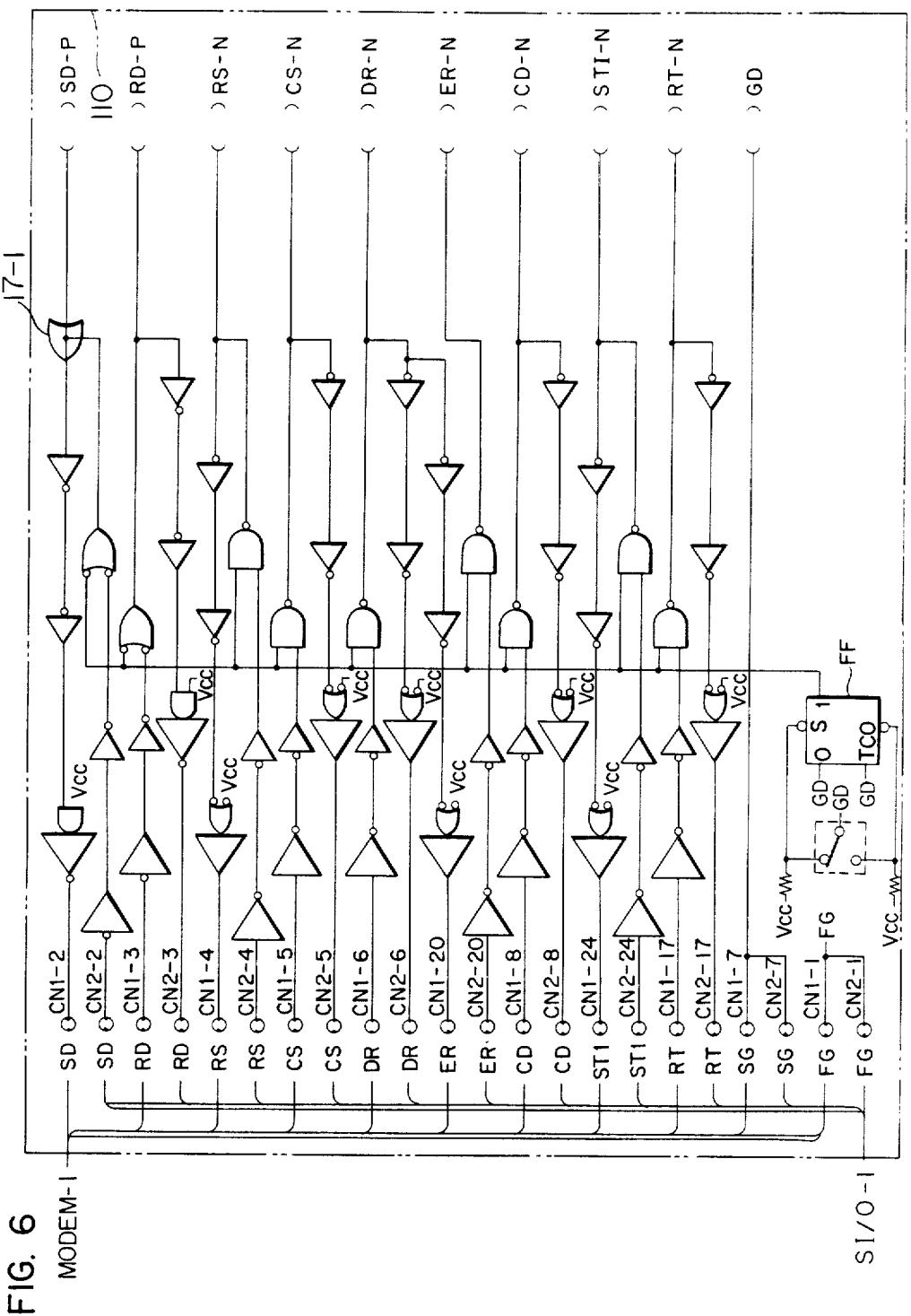
FIG. 6 is a circuit diagram showing the internal schematic of a plug-in SFA 800(1) 110 for the connection to the modulation-demodulation apparatus in the serial input/output unit 100-1 in FIG. 5.
Figure 7:
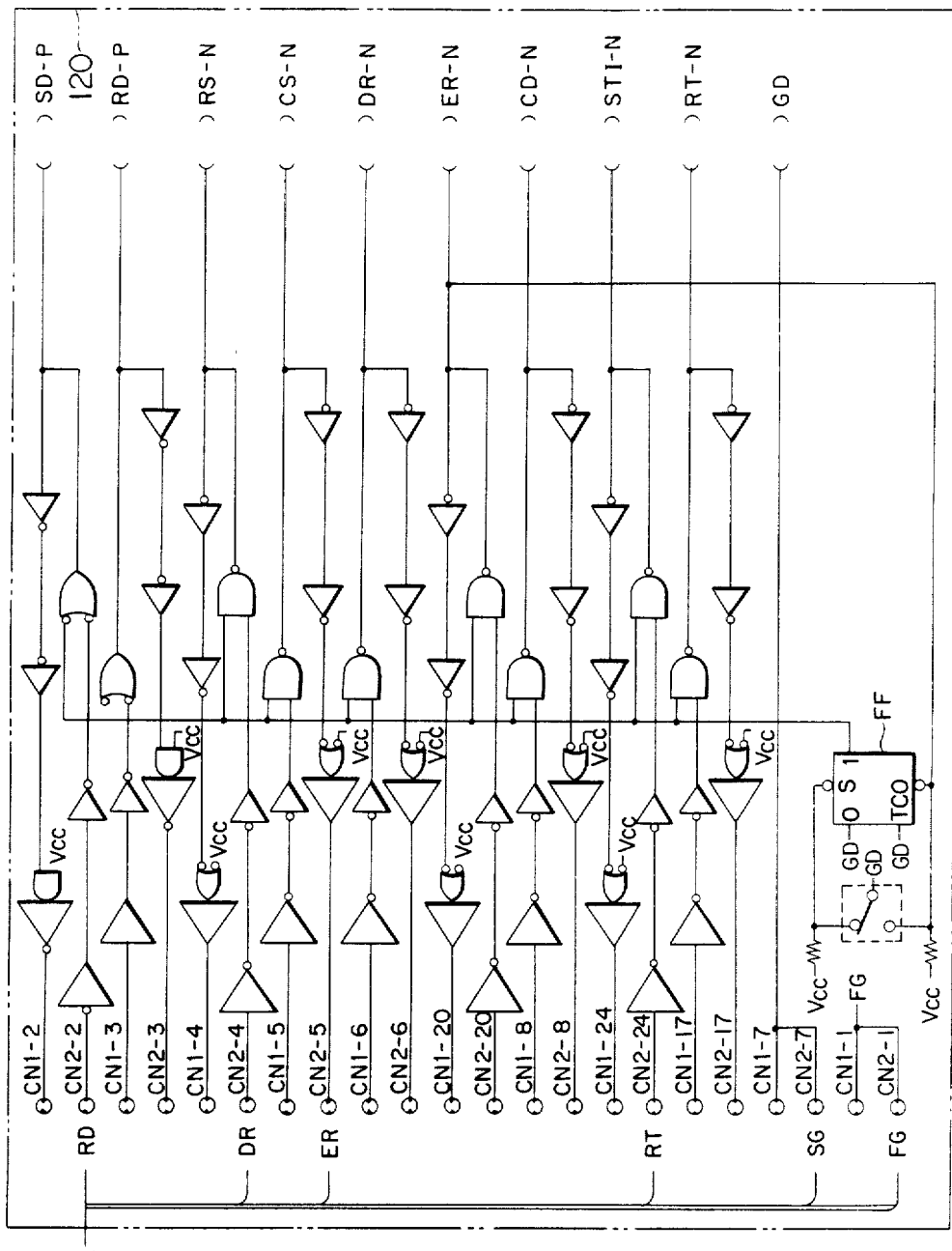
FIG. 7 is a circuit diagram showing the internal schematic of a plug-in SFA 800(2) 120 for connection to the modulation-demodulation apparatus in the serial input-/output unit 100-1 in FIG. 5.

A specific embodiment of the modulation demodulation operation corresponding to the apparatus (3-1), (4-1A), (4-1B) used by this invention in a slave station is a MODEM of those following CCITTV.28, including that shown in FIG. 4. Upstream transmission line 10-1 to the master station and the downward transmission line 9 from the master station are connected with the R Line input and S LINE input of the MODEM having the modulator (3-1) and the demodulator (4-1A), respectively. In the same way, the upstream transmission line 10-2 from the downstream slave stations is connected with the DEM 4-1B following CCITTV.28. Signal lines MODEM-1 and MODEM-2 from MODEM and DEM follows the international standard EIAR3232C. As shown in FIG. 5, MODEM-1 is connected with a connector CN1, or the input, of a plug-in 110 for the connection of MODEM of S I/O unit 100-1. MODEM-2 is connected with the connector CN2, or the input, or a plug-in 120 for connection of MODEM. Specific examples of plug-in 110 and plug-in 120 for the connection of MODEM are shown in FIG. 6 and FIG. 7, respectively. Mutual connection is done by the signal names shown at the right end.

Figure 8:
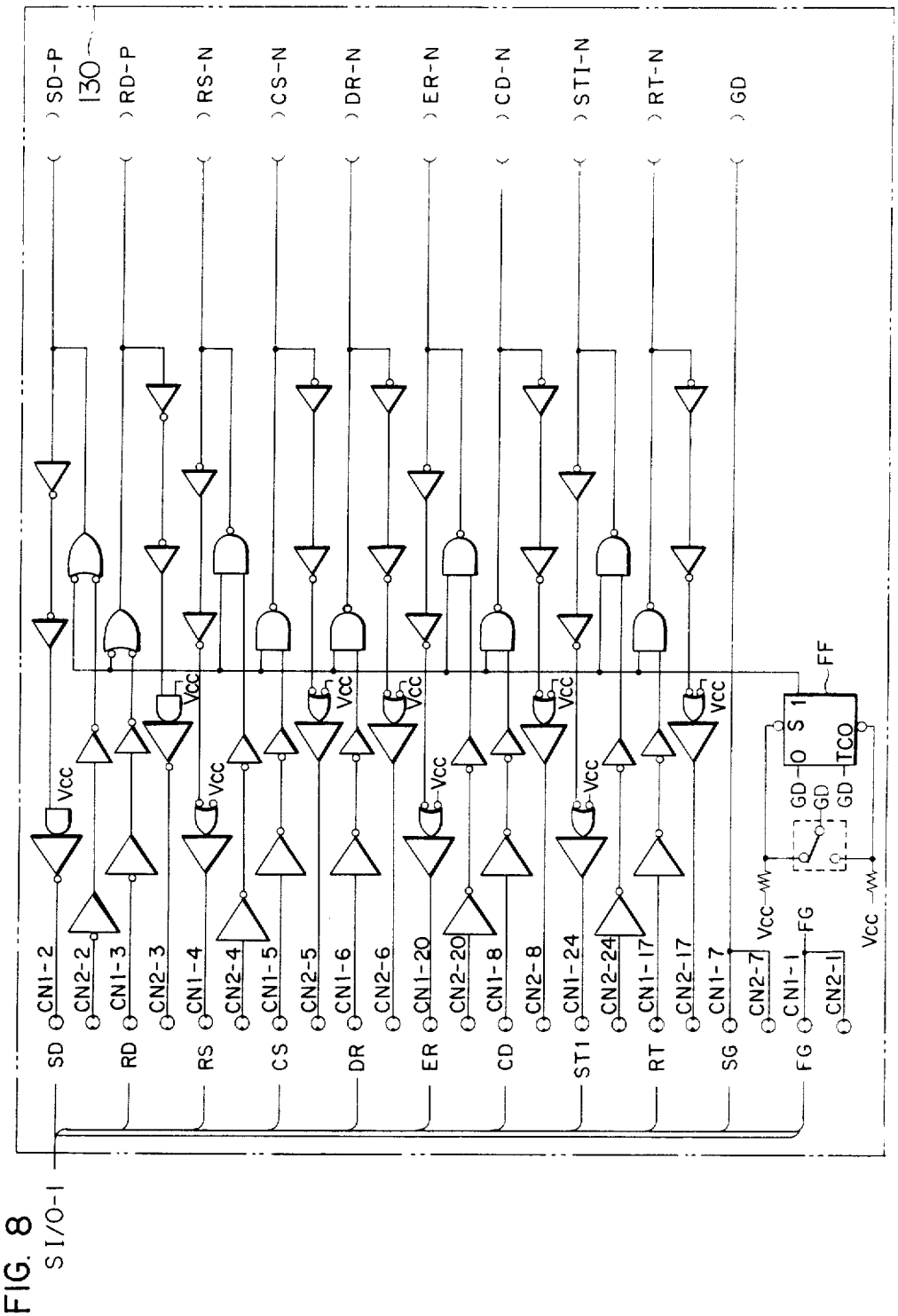
FIG. 8 is a circuit diagram showing the internal schematic of a plug-in 800(3) 130 for connection to the modulation-demodulation apparatus in the basic part BASIC UNIT of the slave station 2-1 in FIG. 5.

The connector CN2, or the output, of the plug-in 110 for the connection of MODEM and the connector CN1, or the input, of the plug-in 130 of the basic part BASIC UNIT of the slave station 2-1 are connected with each other by a signal line SI/O-1 following EIA RS232C. The basic part of the slave station 2-1 is constituted with the plug-in 130, a line buffer SFA000 connected with the plug-in 130 with the signal names as shown on the right end of FIG. 8, and an analog input controller AICE SFA 200, a digital input controller DICE SFA 130, a pulse input controller PCICE SFA 150 and a digital output controller DOCE SFA 300 which are connected with the input-output bus of the line buffer SFA000. After the start of operation of the slave station 2-1, the D-R signal of the modulator-demodulator becomes an ER signal in the plug-in 110 shown in FIG. 6 and the line buffer LB SFA000 turns on the RS-N signal by this ER signal. By switching the RS-N signal on, the modulation part 3-1 of MODEM starts operation. The MODEM-2 signal of the modulator-demodulator which uses only a demodulator turns on the RS-N signal by the DR signal through the plug-in 120 as shown in FIG. 7. Ths RS-N signal and the above-mentioned RS-N signal are passed through a WIRED OR in the S I/O UNIT 100-1. A CS-N signal for the RS-N signal becomes the ER signal of the modulator-demodulator by using only a demodulator. A call signal for the slave station #1 through the downstream transmission line 9 from the master station is demodulated by the demodulator 4-1A and introduced into the plug-in 110 of the connection part SI/O UNIT 100-1 as the signal MODEM-1 following EIA RS 232C. This signal is converted into a TTL level in the plug-in 110 as shown in FIG. 6 and introduced into the line buffer LBSFA 000 as a RD-P signal. In the line buffer, it is decided whether the call is directed to the self station or not. If the call is for the self station, the line buffer LB SFA000 turns on the ER-N signal through the plug-in 130. As a result, through the signal S I/O-1, the flip-flop FF of the plug-in 120 shown in FIG. 7 is turned off, whereby the RD-P signal of MODEM-2 of DEM 4-1B using only a demodulator is interlocked. After switching on the ER-N signal, a response is returned by an SD-P signal. Through signals SI/O-1 and MODEM-1, this response is sent to the upstream transmission line 10-1 through MODEM 3-1. Line buffer LB SFA000 turns the ER-N signal off after finishing the response. Then, the flip-flop FF of the plug-in 120 shown in FIG. 7 is turned on again. If the call is not for the self station, since the line buffer LB SFA000 does not turn on the ER-N signal, the flip-flop FF in the plug-in 120 shown in FIG. 7 is in the ON state. Therefore, the response from a downstream slave station is passed through the upstream transmission line 10-2 and demodulated by DEM 4-1B using only a demodulator. This signal is passed through the plug-in 120 shown in FIG. 7 as the signal MODEM-2 following EIA RS232C to become SDP signal. The latter signal becomes the signal MODEM-1 through the plug-in 110 shown in FIG. 6 and transmitted through MODEM 3-1 to the upstream transmission line 10-1.

The essential of this invention is not limited by the above embodiment but lies in the copending claim.

What is claimed is:

1. A data transmission apparatus of a multi-point connection type including a master station connected to a downstream transmission medium through a master modulating means, and a plurality of slave stations each connected to said downstream transmission medium through a respective first slave demodulating means, said master station having means for transmitting a call signal to one of said slave stations through said downstream transmission medium, each slave station also being connected to an upstream transmission medium through respective slave modulating means, said master station being connected to said upstream transmission medium through a master demodulating means, and each slave station having means for transmitting a response signal through said upstream transmission medium to said master station, said data transmission apparatus further comprising second slave demodulating means provided at each slave station, said upstream transmission medium being connected at one end to said master demodulating means and being arranged to connect in series said slave modulating means of a slave station to said second slave demodulating means of an adjacent upstream slave station, so that a carrier wave propagating on said upstream transmission medium is demodulated in each slave station and then re-modulated before being sent to the adjacent upstream slave station to always maintain said carrier wave in an on-state during the period said apparatus remains activated.

2. A data transmission apparatus according to claim 1, wherein said modulating means and said demodulating means of said master station and said slave stations each comprise a MODEM.

3. A data transmission apparatus according to claim 1, wherein said slave modulating means and said slave demodulating means of each slave station are connected to said slave station through respective signal lines.

4. A data transmission apparatus according to claim 1, wherein said slave modulating means and said second slave demodulating means at each slave station are connected with each other by a signal line.

5. A data transmission apparatus of a multi-point connection type according to claim 1, wherein each of said plurality of slave stations is operatively connected, via respective first slave demodulating means, to a different location point along said downstream transmission medium.

6. A data transmission apparatus of a multi-point connected type according to claim 5, wherein said slave modulating means and said second slave demodulating means, associated with each slave station, are connected in series, and said upstream transmission medium is provided to connect each of these respective series connections in series along the length of said upstream transmission medium.

7. A data transmission apparatus of a multi-point connection type according to claim 6, wherein said upstream transmission medium and said downstream transmission medium comprise respective transmission lines.

8. A data transmission apparatus of a multi-point connection type according to claim 6, wherein said call signal identifies a respective slave station and is in the form of a coded address signal.

9. A data transmission apparatus of a multi-point connected type according to claim 1, wherein said upstream transmission medium and said downstream transmission medium comprise respective transmission lines.

10. A data transmission apparatus of a multi-point connection type comprising:
   a master station coupled to a downstream transmission medium via a master modulating means for transmitting information to a plurality of slave stations;
   a plurality of first slave demodulating means, each of said slave stations being coupled through a respective one of said first slave demodulating means to a different location point along said downstream transmission medium such that said master station is able to selectively transmit information along said downstream transmission medium to a particular one or more slave stations identified by corresponding call signals included in said transmitted information;
   a plurality of slave modulating means, each of said slave stations being coupled to a respective one of said slave modulating means, a master demodulating means connected to said master station, and an upstream transmission medium connecting said plurality of slave modulating means in series to said master demodulating means;
   a plurality of second demodulating means, each having an input coupled to an output of a downstream slave modulating means, the output of each of said second demodulating means being coupled to an input of a respective upstream slave modulating means so that the input of said second demodulating means and the output of said slave modulating means, corresponding to respective and individual slave stations, are respectively coupled to the output of the slave modulating means corresponding to the immediately next and further downstream slave station and to the input of the second demodulating means corresponding to the immediately next and further upstream slave station, or to the master demodulating means, so that a carrier wave transmitted on said upstream transmission medium is demodulated by said second slave demodulating means and then re-modulated via said slave modulating means in each slave station, in order to always maintain said carrier wave in an on-state during the period said apparatus remains activated.

11. A data transmission apparatus of a multi-point connected type according to claim 10, wherein said call signals correspond to respective slave station location address information that is transmitted as part of said data information.

12. A data transmission apparatus of a multi-point connected type according to claim 11, wherein said upstream transmission medium and said downstream transmission medium comprise respective transmission lines.

13. A data transmission apparatus in which a master station selectively communicates with one or more of a plurality of slave stations by sending call signals including slave station addresses to said slave stations and receives a response signal from those slave stations to which a call signal has been sent, comprising:

a master station having a master modulating means for modulating call signals to be sent to one or more slave stations and master demodulating means for demodulating response signals received from said slave stations;

a plurality of slave stations, each including slave modulating means for modulating a response signal to be sent to said master station and a first slave demodulating means for demodulating a call signal received from said master station and wherein each slave station except the station furthest downstream from said master station including a second slave demodulating means for demodulating a response signal received from another slave station and for applying the thus demodulated response signal to the slave modulating means of that station;

a first transmission medium connecting said first slave demodulating means of each of said slave stations in multi-drop configuration to said master modulating means of said master station; and a second transmission medium connecting said slave stations daisy-chain configuration to said master demodulating means of said master station by connecting a slave modulating means of each station to the second slave demodulating means of the next adjacent upstream slave station or to said master demodulating means in the case of the slave station adjacent said master station.

* * * * *